United States Patent [19]

Sorenson et al.

[11] B 3,923,744

[45] Dec. 2, 1975

[54] POLYOLS CONTAINING KETAL GROUPS AND POLYURETHANES PREPARED THEREFROM

[75] Inventors: Marius Walter Sorenson, Lake Jackson; Ross Clinton Whiteside, Jr., Angleton; Richard Allan Hickner, Lake Jackson, all of Tex.

[73] Assignee: The Dow Chemical Company, Midland, Mich.

[22] Filed: May 23, 1973

[21] Appl. No.: 363,205

[44] Published under the Trial Voluntary Protest Program on January 28, 1975 as document no. B 363,205.

[52] U.S. Cl. ...... 260/77.5 AP; 117/128.4; 117/132; 252/182; 260/2.5 AP; 260/2.5 AB; 260/2.5 AC; 260/59; 260/77.5 AB; 260/77.5 AC; 260/77.5 AQ; 260/615 A; 260/47 CB

[51] Int. Cl.$^2$............................................ C08G 18/32
[58] Field of Search ............... 260/77.5 AP, 77.5 AQ, 260/2.5 AP, 59, 47 CB; 252/182

[56]  References Cited
UNITED STATES PATENTS

| | | | |
|---|---|---|---|
| 3,420,800 | 1/1969 | Haggis | 260/77.5 AM |
| 3,691,135 | 9/1972 | Schulze et al. | 260/77.5 AP |

Primary Examiner—M. J. Welsh
Attorney, Agent, or Firm—James G. Carter

[57] ABSTRACT

Capped polyols are prepared by reacting the polyols with an ethylenically unsaturated ether. These capped polyols can be blended with polyisocyanates and employed as one-can urethane coatings.

12 Claims, No Drawings

POLYOLS CONTAINING KETAL GROUPS AND POLYURETHANES PREPARED THEREFROM

This invention relates to capped polyols and polyurethane compositions prepared therefrom and to one package polyurethane coating compositions.

It is known that two-package polyol cured urethane coatings give outstanding properties such as excellent gloss, abrasion resistance, hardness, durability, etc. One-package blocked urethanes also possess these excellent properties and the one-package offers the advantage of better and easier handling properties. To our knowledge all one-package polyol-urethane blocked systems are based on blocking the isocyanate such as reacting the isocyanate with phenol or a ketoxime. The disadvantage with current blocked urethane systems is that they require heat to disassociate the blocked isocyanate so that the isocyanate and polyol can react. There are numerous applications where heat curing in an oven is not desirable. The advantage of the present invention over the known art is that the composition containing the blocked polyols of the present invention are curable at room temperature. Therefore, the present invention offers the convenience of a one-package system and is not limited to heat curing applications. The blocked polyol and isocyanate mixtures are relatively stable at room temperature. When the mixture is exposed to the atmosphere, moisture in the air results in deblocking of the capped-polyol by hydrolysis. The polyol and isocyanate then react to form a polyurethane.

Another advantage is that the capped-polyols of the present invention are lower in viscosity than the uncapped polyol which is particularly advantageous in coating applications.

The capped polyols of the present invention may be represented by the formula

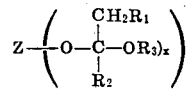

wherein Z is the polyvalent residue which would result from the removal of the hydroxyl groups from a polyol having an average molecular weight of from about 260 to about 3,000 and preferably from about 500 to about 900 wherein $R_3$ is a hydrocarbon group having from 1 to about 6 carbon atoms, and each $R_1$ and $R_2$ is independently hydrogen, a hydrocarbon group having from 1 to about 6 carbon atoms and $R_1$ and $R_2$ can collectively represent the group $-CH_2-CH_2-CH_2-CH_2-$, and x has a value of from 2 to about 8.

Any polyol having from 2 to about 8 and preferably from about 2 to about 4 hydroxyl groups can be reacted with an ethylenically unsaturated ether to produce the capped polyols of the present invention.

Suitable polyols which may be capped with an ethylenically unsaturated ether include polyether polyols, polyester polyols, ester-modified polyether polyols and the like, all of which are well known in the art as taught in *HIGH POLYMERS VOL. XVI, POLYURETHANES CHEMISTRY AND TECHNOLOGY, PARTS I AND II* by Saunders and Frisch, Interscience, 1964, as well as those described in U.S. Pat. Nos. 3,502,601; 3,459,733 and 3,585,385.

Particularly suitable are the liquid polyols prepared by reacting a compound having more than 1 active hydrogen atom in the form of $-OH$ or $N(H)_x$ groups wherein x has a value from 1 to 3, such as ethylene glycol, propylene glycol, glycerine, ammonia, trimethylol propane, ethylene diamine aminoethylethanol amine, resorcinol, hydroquinone, bisphenols, novolac resins, mixtures thereof and the like with a vicinal epoxy containing compound such as, for example, ethylene oxide, propylene oxide, 1,2-butylene oxide, 2,3-butylene oxide, epichlorohydrin, epibromohydrin, epiodohydrin mixtures thereof and the like.

The capped polyols of the present invention may be prepared by reacting the polyol with an ethylenically unsaturated ether at temperatures of from about $-10°C$ to about $+90°C$ in the presence of an acidic catalyst such as, for example, hydrochloric acid, sulfuric acid, boron trifluoride, paratoluene sulfonic acid, ion exchange resins in the acid form, mixtures thereof and the like. The time of reaction depends upon the temperature and the time in each instance is the time required at the temperature employed to complete the reaction. The quantity of ethylenically unsaturated ether is employed in quantities of at least one mole of said ether per active hydrogen group contained in the polyol to be capped. Excess quantities can be employed and any such excess can be removed by normal recovery means such as by evaporation, distillation and the like.

Suitable ethylenically unsaturated ethers which may be employed to prepare the capped polyols of the present invention include those represented by the formula $$R_2-C = CHR_1$$
$$OR_3$$

wherein each $R_1$ and $R_2$ is independently hydrogen, a hydrocarbon group having from 1 to about 6 carbon atoms or $R_1$ and $R_2$ can collectively represent the group $-CH_2-CH_2-CH_2-CH_2-$, and $R_3$ is a hydrocarbon group having from 1 to about 6 carbon atoms.

Suitable such ethylenically unsaturated ethers include, for example, methyl isopropenyl ether, vinyl methyl ether, vinyl ethyl ether, vinyl propyl ether, vinyl cyclohexyl ether, ethyl isopropenyl ether, isopropyl isopropenyl ether, butyl isopropenyl ether, hexyl isopropenyl ether, cyclohexyl isopropenyl ether, mixtures thereof and the like.

If desired, the reaction can be conducted in the presence of a solvent or a liquid reaction medium. When the polyols to be capped are solids, semi-solids or highly viscous liquids, the use of a solvent or liquid reaction medium is most desirable. Suitable such solvents or liquid reaction mediums include, for example, acetone, methyl ethyl ketone, ethylene dichloride, methylene chloride, dimethyl formamide, toluene, benzene, hexane, mixtures thereof and the like.

The only requirement for the solvent or liquid reaction medium is that it not react with or interfere with the reaction between the polyol and ethylenically unsaturated ether and can be readily removed if desired.

The capped polyols of the present invention possess lower viscosities or solution viscosities than do the uncapped polyols. This is highly desirable in coating applications wherein less solvent is required to reduce the coating compositions to suitable application viscosities.

The capped polyols of the present invention are relatively stable in the absence of water up to temperatures of about 100°C.

The capped polyols of the present invention are particularly suitable for use in so-called "one-can" coating applications. The capped polyol and isocyanate can be blended together with or without suitable additives such as fire retardant agents, solvents, fillers, catalysts, coloring agents and the like.

Suitable polyisocyanates are any organic polyisocyanate having more than 1 NCO group per molecule. Such polyisocyanates are well known in the art and many are described in the afore-mentioned book by Saunders and Frisch.

Suitable such polyisocyanates include, for example,
polymethylene polyphenylisocyanate,
1,5-naphthalenediisocyanate,
cumene-2,4-diisocyanate,
4-methoxy-1,3-phenylenediisocyanate,
4-chloro-1,3-phenylenediisocyanate,
4-bromo-1,3-phenylenediisocyanate,
4-ethoxy-1,3-phenylenediisocyanate
2,4'-diisocyanatodiphenylether,
5,6-dimethyl-1,3-phenylenediisocyanate,
2,4-dimethyl-1,3-phenylenediisocyanate,
4,4'-diisocyanatodiphenylether,
benzidinediisocyanate,
4,6-dimethyl-1,3-phenylenediisocyanate,
4,4'-diisocyanatodibenzyl,
9,10-anthracenediisocyanate,
3,3'-dimethyl-4,4'-diisocyanatodiphenylmethane,
2,6'-dimethyl-4,4'-diisocyanatodiphenyl,
2,4-diisocyanatostilbene,
3,3'-dimethyl-4,4'-diisocyanatodiphenyl,
3,3'-dimethoxy-4,4'-diisocyanatodiphenyl,
1,4-anthracenediisocyanate,
2,5-fluorenediisocyanate,
1,8-naphthalenediisocyanate,
2,6-diisocyanatobenzfuran,
isophorone diisocyanate,
2,4,6-toluenetriioscyanate, and
2,4,4'-triisocyanatodiphenylether.

Other organic polyisocyanates that can be used are the polyisocyanates described in Canadian Pat. No. 700,026 and in U.S. Pat. No. 2,683,730; the phenyl indane diisocyanates which are described in U.S. Pat. No. 2,855,385, the organic diisocyanates and the organic triisocyanates which are described in U.S. Pat. No. 2,292,443; and the organic triisocyanates which are described in U.S. Pat. No. 2,929,794.

Other suitable polyisocyanates include those polymers or quasi-prepolymers prepared by reacting an excess of a polyisocyanate with a polyhydroxyl containing compound. The polyhydroxyl containing compound may be the same as or a different polyol as that reacted with an ethylenically unsaturated ether to form the capped polyols described herein.

Polyurethanes can be prepared from the capped polyols of the present invention and polyisocyanates by any of the well known techniques such as, for example, the prepolymer method, quasi-prepolymer method, or one-shot method, all of which are described in the aforementioned book by Saunders and Frisch. The ratio of isocyanate to capped polyol is that corresponding to a ratio of NCO groups contained in the polyisocyanate:hydroxyl groups contained in the polyol before capping is from about 0.7:1 to 1.4:1 and preferably from about 1.0:1 to about 1.2:1.

Foams can be prepared from the capped polyols of the present invention by adding any well known blowing or foaming agent to the mixture comprising the capped polyol and polyisocyanate. It usually, however, requires the application of heat to start the foaming reaction and facilitate the removal of the unsaturated ether so that the resultant uncapped polyol can react with the polyisocyanate. The heat can be self-generated by the use of water as a portion of the foaming agent since the water will generate heat when reacted with the isocyanate.

Suitable blowing or foaming agents include aliphatic hydrocarbons boiling below 110°C. or halogenated aliphatic hydrocarbons boiling below 110°C. such as dichlorodifluoromethane, trichlorofluoromethane, hexane, hexene, or pentane as the blowing or foaming agent. Suitable foaming or blowing agents are also disclosed in U.S. Pat. No. 3,072,582.

Where the application is in the form of coatings, the unsaturated ether can be removed by hydrolysis at room temperature since there is more exposed surface or contact with the moisture in the atmosphere.

The curable compositions can be cured either by exposure to the moisture in the air when employed as coatings either at room temperature or at elevated temperatures or combinations thereof and when employed in applications such as castings, foams, elastomers and the like, it is usually desirable to employ heat to facilitate the curing thereof.

The curable compositions of the present invention may also contain catalysts for urethane formation such as tertiary amines and/or organo metal compounds. The use of such catalysts is particularly desirable when an aliphatic polyisocyanate is employed.

Suitable tertiary amines include, for example, triethylenediamine, N-ethylmorpholine, bis(2-dimethylaminoethyl)ether, N,N'-bis(dimethylaminoethyl) piperazine, tetramethyl butanediamine, dimethylethanolamine, tris (2-dimethylaminomethyl) ether, mixtures thereof and the like.

Suitable organo metal catalysts include, for example, stannous octoate, lead octoate, dibutyl tin dilaurate, dibutyl tin diacetate, mixtures thereof and the like.

The physical properties of the resultant cured articles of course will depend upon the type of polyol and polyisocyanate employed as well as the various additives, all of which is well known in the art as to what effect each has upon the resultant products.

The following examples are illustrative of the present invention but are not to be construed as limiting the scope thereof in any manner.

EXAMPLE 1

Preparation of Capped Polyol

Into a 2-liter flask equipped with stirrer, condenser, addition funnel, and temperature control means was added 864 grams (12 moles) of methyl isopropenyl ether. Concentrated HCl was added in a quantity sufficient to lower the pH to a value of 1. The solution was heated to reflux (37°C) and 470 grams (2 OH equivalents) of a polyol which was the reaction product of glycerine with propylene oxide to a molecular weight of about 700 was added over a period of 1 hour, and the resultant mixture was maintained at reflux (37°C) for an additional 4 hour period. Caustic pellets (NaOH) were added in a sufficient quantity to raise the pH to a value of 8. The solution was then cooled to room temperature and filtered. The excess methyl isopropenyl ether was removed by vacuum stripping on a Rinco Rotorfilm evaporator at 0.1 mm Hg and <30°C. Infrared analysis of the 614 grams of the resultant capped polyol revealed a 98.9 percent capping of the OH groups contained in the polyol.

The resultant capped polyol had a viscosity of 55 centistokes at 25°C whereas the polyol before capping had a viscosity of 772 centistokes at 25°C.

EXAMPLE 2

Preparation of Capped Polyol

The procedure of Example 1 was repeated with the following components:
  864 grams of methyl isopropenyl ether
  170 grams of the reaction product of glycerine with propylene oxide to a molecular weight of about 260.

Infrared analysis of the resultant capped-polyol revealed that 100 percent of the hydroxyl groups of the polyol had been capped.

The resultant capped polyol had a viscosity of 33 centistokes at 25°C whereas the uncapped polyol had a viscosity of 881 centistokes at 25°C.

EXAMPLE 3

Preparation of Coatings from Capped Polyols

One package coating compositions were prepared from the capped polyols of Examples 1 and 2 and for comparative purposes the uncapped polyols employed in Examples 1 and 2 employing a prepolymer having 18 percent free NCO groups which was a 60 percent solution of the adduct of trimethylol propane with an 80/20 mixture of 2,4-/2,6-toluenediisocyanate (at a mole ratio of 1 to 3) in a solvent consisting of 50 percent by weight of ethylene glycol monoethyl ether acetate and 50 percent by weight of xylene.

The coating compositions were applied to cold rolled steel Q panels using an 18 gauge Meyer wire wound rod and air cured for 6 days at room temperature. The properties of the resultant coatings are given in the following Table I.

TABLE I

| Run No. | Formulation | Tack-Free Dry Time (hours) | Cure Schedule (Days at Room Temp.) | Flexibility ⅛ in. Mandrel Bend | 60° Gloss | Forward Impact (lbs.) | Reverse Impact (lbs.) |
|---|---|---|---|---|---|---|---|
| 1 (comparative) | 32.0 g uncapped polyol of Ex. 2<br>168.0 g prepolymer solution | 2.0 | 6 | Failed | — | 5.0<br>6.0* | 2.0<br>3.0* |
| 2 | 52.0 g capped polyol of Ex. 2<br>148.0 g prepolymer solution | 3.0 | 6 | Failed | — | 5.0<br>6.0* | 2.0<br>3.0* |
| 3 (comparative) | 70.0 g uncapped polyol of Ex. 1<br>130.0 g prepolymer solution | 2.0 | 6 | Passed | 94% | 160.0<br>160.0* | 160.0<br>160.0* |
| 4 | 80.0 g capped polyol of Ex. 2<br>120.0 g prepolymer solution | 2.5 | 6 | Passed | 94% | 150.0<br>160.0* | 140.0<br>160.0* |
| 5 (comparative) | 14.2 g uncapped polyol of Ex. 2<br>39.4 g uncapped polyol of Ex. 1<br>146.4 g prepolymer solution | 2.0 | 6 | Passed | — | 30.0<br>50.0* | 6.0<br>40.0* |
| 6 | 23.4 g capped polyol of Ex. 2<br>45.8 g capped polyol of Ex. 1<br>130.8 g prepolymer solution | 2.5 | 6 | Passed | — | 10.0<br>160.0* | 4.0<br>140.0* |

*Samples were post-cured for 30 minutes at 120°C.

EXAMPLE 4

Stability tests were conducted on the coating compositions employing the formulations employed in Example 3 by placing portions of each formulation in sealed Gardner viscosity tubes and storing at room temperature. The Gardner Viscosity of each of the samples were checked periodically. The results are given in the following Table II.

TABLE II

| Aging Time at Room Temperature | 1 (Comparative) | 2 | 3 (Comparative) | 4 | 5 (Comparative) | 6 |
|---|---|---|---|---|---|---|
| 0 hours | 4.5 | 1.8 | 3.3 | 1.8 | 3.0 | 2.0 |
| 3 hours | 12.0 | 2.0 | 6.5 | 3.1 | 6.0 | 3.0 |
| 9 hours | 27.0 | 2.2 | 9.2 | 3.4 | 9.5 | 3.2 |
| 20 hours | 110.0 | 2.4 | 20.0 | 3.6 | 20.0 | 3.3 |
| 32 hours | Gel | 2.6 | 43.0 | 3.9 | 46.0 | 3.9 |
| 46 hours |  | 3.0 | 100.0 | 4.5 | 110.0 | 4.0 |
| 60 hours |  | 3.0 | Gel | 5.0 | Gel | 5.0 |
| 3 days |  | 3.5 |  | 5.5 |  | 5.0 |
| 5 days |  | 4.3 |  | 6.8 |  | 6.3 |
| 7 days |  | 5.5 |  | 8.2 |  | 8.0 |
| 10 days |  | 7.7 |  | 10.4 |  | 10.6 |
| 12 days |  | 9.1 |  | 12.5 |  | 13.0 |
| 13 days |  | 11.0 |  | 14.4 |  | 14.8 |
| 18 days |  | 17.0 |  | 20.0 |  | 22.0 |
| 19 days |  | 17.0 |  | 21.0 |  | 24.0 |
| 20 days |  | 23.0 |  | 29.0 |  | 32.0 |
| 24 days |  | 26.0 |  | 31.0 |  | 35.0 |
| 28 days |  | 40.0 |  | 44.0 |  | 47.0 |
| 31 days |  | 47.0 |  | 51.0 |  | 60.0 |
| 40 days |  | 83.0 |  | 77.0 |  | 104.0 |

* Refer to Table I for formulations of each run.

EXAMPLE 5

A. Preparation of Capped Polyol

Employing the procedure of Example 1, a capped polyol was prepared from:
186 grams of the adduct of a 3.5 functional phenol-formaldehyde novolac resin with propylene oxide to a molecular weight of about 775 (4.57% OH).
360 grams of methyl isopropenyl ether.

Infrared analysis of the resultant capped polyol revealed that about 99.5 percent of the hydroxyl groups were converted to the corresponding ether. The capped polyol had a viscosity at 25°C of 468 centistokes whereas the uncapped polyol had a viscosity of 1,860 centistokes.

B. Preparation of Capped Polyol

Employing the procedure of Example 1, a capped polyol was prepared from:
204.3 grams of the reaction product of bisphenol A with 4 moles of ethylene oxide, said product containing 8.32% OH.
720 grams of methyl isopropenyl ether.

Infrared analysis of the resultant capped polyol revealed that 99.4 percent of the hydroxyl groups were converted to the corresponding ether. The capped polyol had a viscosity at 25°C of 610 centistokes whereas the uncapped polyol had a viscosity of 7,400 centistokes.

C. Preparation of Coatings

Coatings were prepared from each of the capped and uncapped polyols of A and B above employing as the polyisocyanate the same prepolymer employed in Example 3.

The formulations, stability data and properties of films therefrom which were applied to Bonderite 37 steel panels and cured for 1 week at room temperature, about 77°F, are given in the following Table III.

TABLE III

| COATING COMPOSITION NO. | STABILITY | | | CURED FILM PROPERTIES | |
|---|---|---|---|---|---|
| | GARDNER VISCOSITY | | | | Reverse |
| | Initial | After 24 hrs. | After 1 week | Pencil Hardness | Impact (In-lbs) |
| 1. 18.0 grams of prepolymer<br>14.05 grams of capped polyol prepared in Ex. 5-A. | K | O | W | 3H | Passed 140 |
| 2. 18.0 grams of prepolymer<br>(Comparative)<br>16.6 grams of uncapped polyol employed in Ex. 5-A. | N | >U | gelled | 3H | Passed 140 |
| 3. 18.0 grams of prepolymer<br>14.05 grams of capped polyol prepared in Ex. 5-B.<br>4.0 grams of methyl n-butyl ketone | I | N | U | 3H | Passed 120 |
| 4. 18.0 grams of prepolymer<br>(Comparative)<br>10.45 grams of uncapped polyol employed in Ex. 5-B.<br>4.0 grams of methyl n-butyl ketone | L | U | gelled | 3–4H | Failed 100 |

D. Preparation of Coatings

Coatings were prepared from the capped and uncapped polyols of Example 5-B employing as the polyisocyanate Desmodur IL a trimer of toluene diisocyanate having an NCO content of 8 percent commercially available from Mobay Chemical Co. employing the following formulation.

Coating D-1
26.25 grams of Desmodur IL
14.05 grams of the capped polyol prepared in Ex. 5-B.
5 grams of methyl n-butyl ketone
4 drops of dibutyl tin diacetate Coating D-2 (Comparative)
26.25 grams Desmodur IL
10.45 grams uncapped polyol employed in Ex. 5-B
5 grams of methyl n-butyl ketone
4 drops of dibutyl tin diacetate Each of the above compositions produced tackfree films within 15–20 minutes at room temperature with essentially identical properties.

E. Preparation of Coatings

Coatings were prepared from the capped and uncapped polyols of Example 5-A employing as the polyisocyanate:
Vorite 686 which is a prepolymer prepared from castor oil and a cycloaliphatic polyisocyanate, said prepolymer having an NCO content of 9.3 percent and is commercially available from Baker Castor Oil Co.

Coating E-1
22.6 grams of Vorite 686
22.2 grams of the capped polyol prepared in Ex. 5-A.
5.0 grams of xylene
4.0 grams of dibutyl tin diacetate Coating E-2 (Comparative)
22.6 grams of Vorite 686
18.6 grams of the uncapped polyol employed in Ex. 5-A.
6.0 grams of xylene
4.0 drops of dibutyl tin diacetate Coating composition E-2 gelled within 2 hours whereas coating composition E-1 was still fluid after several days.

We claim:
1. Curable compositions which comprise
A. a capped polyol represented by the formula

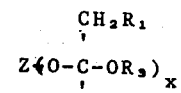

wherein Z is the polyvalent residue which would result from the removal of the hydroxyl groups from an uncapped polyol having from 2 to about 8 hydroxyl groups, an average molecular weight of from about 260 to about 3,000;

wherein $R_3$ is a hydrocarbon group having from 1 to about 6 carbon atoms and each $R_1$ and $R_2$ is independently hydrogen, a hydrocarbon group having from 1 to about 6 carbon atoms and $R_1$ and $R_2$ can collectively be the group —CH$_2$—CH$_2$—CH$_2$—CH$_2$-, $x$ has a value of from 2 to about 8, and B. an organic polyisocyanate in proportions so as to provide an NCO:hydroxyl group ratio contained in the uncapped polyol of from about 0.7:1 to about 1.4:1.

2. The compositions of claim 1 wherein the polyisocyanate is in the form of a prepolymer.

3. Curable compositions of claim 1, wherein said uncapped polyol before capping has from about 2 to about 4 hydroxyl groups and an average molecular weight of from about 500 to about 900.

4. The curable compositions of claim 3 wherein the polyisocyanate is in the form of a prepolymer.

5. Curable compositions of claim 3, wherein said uncapped polyol before capping is the reaction product of glycerine with propylene oxide.

6. The curable compositions of claim 5 wherein the polyisocyanate is in the form of a prepolymer.

7. Curable compositions of claim 5, wherein $R_1$, $R_2$ and $R_3$ are methyl groups.

8. The curable compositions of claim 7, wherein the polyisocyanate is in the form of a prepolymer.

9. The polyurethane resulting from curing the composition of claim 5.

10. The polyurethane resulting from curing the composition of claim 6.

11. The polyurethane resulting from curing the composition of claim 7.

12. The polyurethane resulting from curing the composition of claim 8.

* * * * *